US007236614B2

(12) United States Patent
Kuroda et al.

(10) Patent No.: US 7,236,614 B2
(45) Date of Patent: Jun. 26, 2007

(54) DEVICE, SYSTEM, AND METHOD FOR IDENTIFYING LIVING BODIES AND RENEWING REGISTRATION DATA

(75) Inventors: Takuya Kuroda, Kyoto (JP); Mihoko Takahashi, Kyoto (JP); Miharu Sakuragi, Kyoto (JP); Hiroyuki Iwao, Kyoto (JP)

(73) Assignee: OMRON Corporation (JP)

( * ) Notice: Subject to any disclaimer, the term of this patent is extended or adjusted under 35 U.S.C. 154(b) by 458 days.

(21) Appl. No.: 10/085,032

(22) Filed: Mar. 1, 2002

(65) Prior Publication Data

US 2002/0136434 A1 Sep. 26, 2002

(30) Foreign Application Priority Data

Mar. 5, 2001 (JP) ............................ 2001-060269

(51) Int. Cl.

| | |
|---|---|
| ***G06K 9/00*** | (2006.01) |
| ***G06K 9/46*** | (2006.01) |
| ***G06K 9/66*** | (2006.01) |
| ***G06K 9/62*** | (2006.01) |
| ***G06K 9/54*** | (2006.01) |
| ***G06K 9/60*** | (2006.01) |
| ***G06K 19/00*** | (2006.01) |
| ***G05B 19/00*** | (2006.01) |
| ***G05B 23/00*** | (2006.01) |
| ***G06F 7/0004*** | (2006.01) |
| ***G08B 29/00*** | (2006.01) |
| ***G08C 19/00*** | (2006.01) |
| ***H04B 1/00*** | (2006.01) |
| ***H04B 3/00*** | (2006.01) |
| ***H04Q 1/00*** | (2006.01) |
| ***H04Q 9/00*** | (2006.01) |
| *G06Q 40/00* | (2006.01) |
| *G06Q 99/00* | (2006.01) |
| *H04K 1/00* | (2006.01) |
| *H04L 9/00* | (2006.01) |

(52) U.S. Cl. ..................... 382/115; 382/190; 382/209; 382/305; 707/2; 707/9; 340/5.52; 340/5.81; 705/44; 705/67; 705/74

(58) Field of Classification Search ................ 382/118, 382/115, 209, 190, 195, 305; 707/1–10; 705/44, 67, 74; 340/5.52, 5.53, 5.8, 5.81, 340/5.82, 5.83

See application file for complete search history.

(56) References Cited

U.S. PATENT DOCUMENTS 5,067,162 A * 11/1991 Driscoll et al. ............. 382/126

(Continued)

FOREIGN PATENT DOCUMENTS

EP 0903700 A2 * 12/1999

(Continued)

*Primary Examiner*—Bhavesh M. Mehta
*Assistant Examiner*—Manav Seth
(74) *Attorney, Agent, or Firm*—Dickstein Shapiro LLP

(57) ABSTRACT

There are provided a living body collating device, a living body collating system and a living body collating method, which is equipped with optimization candidate data extracting means 35 for extracting optimization candidate data for data renewal from past record data of living body information achieved, optimization candidate data storage means 36 for storing the optimization candidate data extracted by the optimization candidate data extracting means 35, and renewal storage means 37 for storing, as new registration data, the data having higher priorities of the optimization candidate data stored in the optimization candidate data storage means 36 and registration data stored in registration data storage means.

13 Claims, 11 Drawing Sheets

U.S. PATENT DOCUMENTS

| | | | | |
|---|---|---|---|---|
| 5,210,797 | A * | 5/1993 | Usui et al. | 382/126 |
| 5,550,928 | A * | 8/1996 | Lu et al. | 382/116 |
| 5,815,252 | A * | 9/1998 | Price-Francis | 356/71 |
| 5,991,429 | A * | 11/1999 | Coffin et al. | 382/118 |
| 5,995,641 | A | 11/1999 | Yamaguchi | |
| 6,275,601 | B1 * | 8/2001 | Yamaguchi et al. | 382/124 |
| 6,314,196 | B1 * | 11/2001 | Yamaguchi et al. | 382/125 |
| 6,418,235 | B1 * | 7/2002 | Morimoto et al. | 382/118 |
| 6,608,914 | B1 * | 8/2003 | Yamaguchi et al. | 382/118 |

FOREIGN PATENT DOCUMENTS

| | | |
|---|---|---|
| JP | A-3-142685 | 6/1991 |
| JP | 404320583 A * | 11/1992 |
| JP | A-7-271981 | 10/1995 |
| WO | WO 98-25227 | 6/1998 |

* cited by examiner

11 ··· FACE IMAGE COLLATING DEVICE
13 ··· CAMERA

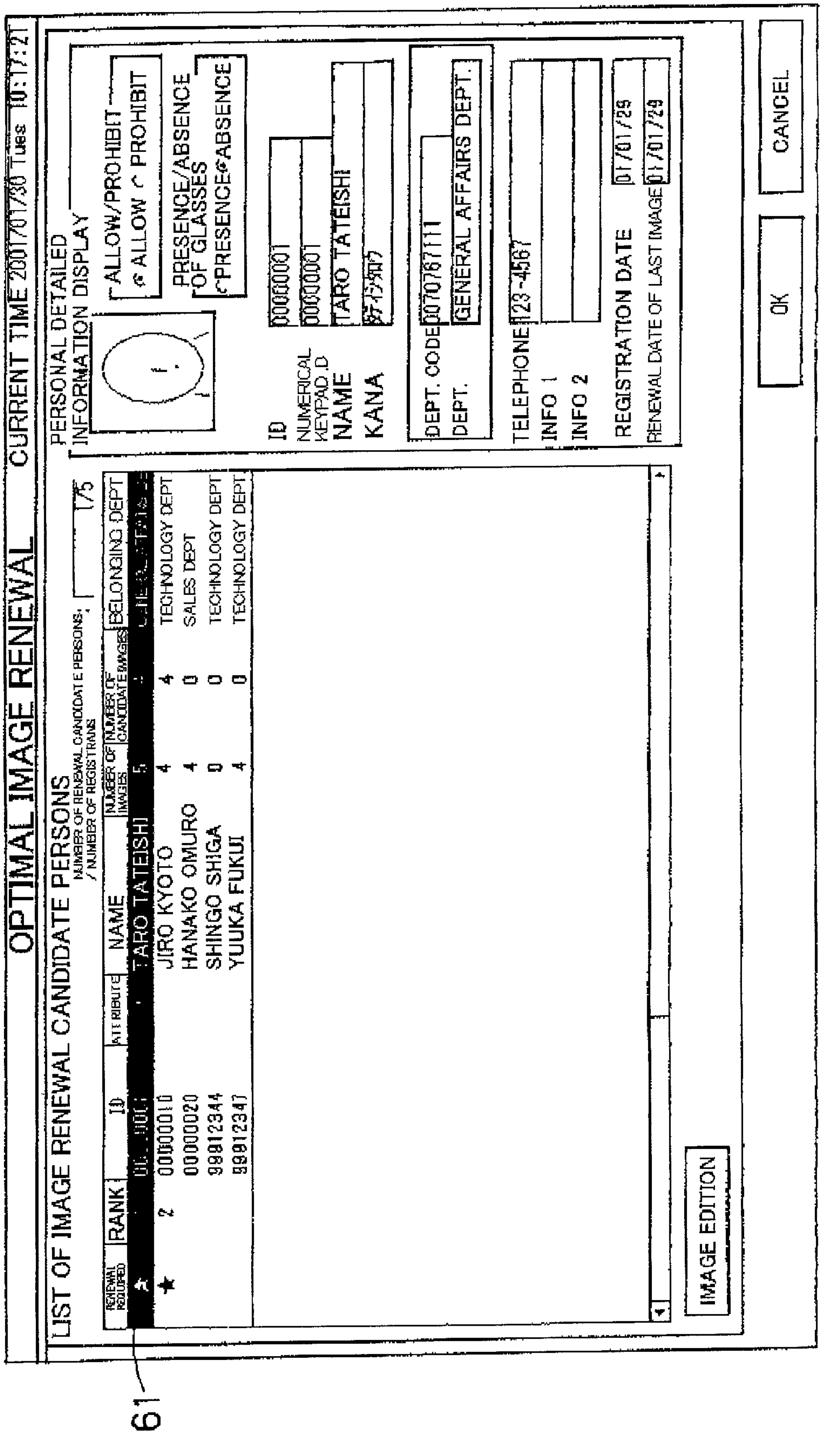

Fig. 6

OPTIMAL IMAGE RENEWAL  CURRENT TIME 2001/01/30 Tues 10:17:21

LIST OF IMAGE RENEWAL CANDIDATE PERSONS

NUMBER OF RENEWAL CANDIDATE PERSONS / NUMBER OF REGISTRANTS  1/5

| RENEWAL REQUIRED | RANK | ID | ATTRIBUTE | NAME | NUMBER OF IMAGES | NUMBER OF CANDIDATE IMAGES | BELONGING DEPT |
|---|---|---|---|---|---|---|---|
| ★ | 1 | 00000001 | | TARO TATEISHI | 5 | 4 | GENERAL AFFAIRS DEPT |
| | 2 | 00000010 | | JIRO KYOTO | 4 | 4 | TECHNOLOGY DEPT |
| | | 00000020 | | HANAKO OMURO | 4 | 0 | SALES DEPT |
| | | 99912344 | | SHINGO SHIGA | 0 | 0 | TECHNOLOGY DEPT |
| | | 99912347 | | YUUKA FUKUI | 4 | 0 | TECHNOLOGY DEPT |

61

IMAGE EDITION

PERSONAL DETAILED INFORMATION DISPLAY

ALLOW/PROHIBIT
● ALLOW ○ PROHIBIT

PRESENCE/ABSENCE OF GLASSES
○ PRESENCE ● ABSENCE

ID  00000001
NUMERICAL KEYPAD ID  00000001
NAME  TARO TATEISHI
KANA  タロウタテイシ

DEPT. CODE  0070767111
DEPT.  GENERAL AFFAIRS DEPT.

TELEPHONE  123-4567
INFO 1
INFO 2

REGISTRATION DATE  01/01/29
RENEWAL DATE OF LAST IMAGE  01/01/29

OK    CANCEL

| DATA | 1 | 2 | 3 | 4 | 5 | 6 | 7 | 8 | 9 | 10 | AVERAGE VALUE |
|---|---|---|---|---|---|---|---|---|---|---|---|
| 1 | C11 | C12 | C13 | C14 | C15 | C16 | C17 | C18 | C19 | C110 | Cm1 |
| 2 | C21 | C22 | C23 | C24 | C25 | C26 | C27 | C28 | C29 | C210 | Cm2 |
| 3 | C31 | C32 | C33 | C34 | C35 | C36 | C37 | C38 | C39 | C310 | Cm3 |
| 4 | C41 | C42 | C43 | C44 | C45 | C46 | C47 | C48 | C49 | C410 | Cm4 |
| 5 | C51 | C52 | C53 | C54 | C55 | C56 | C57 | C58 | C59 | C510 | Cm5 |
| 6 | C61 | C62 | C63 | C64 | C65 | C66 | C67 | C68 | C69 | C610 | Cm6 |
| 7 | C71 | C72 | C73 | C74 | C75 | C76 | C77 | C78 | C79 | C710 | Cm7 |
| 8 | C81 | C82 | C83 | C84 | C85 | C86 | C87 | C88 | C89 | C810 | Cm8 |
| 9 | C91 | C92 | C93 | C94 | C95 | C96 | C97 | C98 | C99 | C910 | Cm9 |
| 10 | C101 | C102 | C103 | C104 | C105 | C106 | C107 | C108 | C109 | C1010 | Cm10 |

→

(B)

| DATA | AVERAGE VALUE |
|---|---|
| 1 | Cm2 |
| 2 | Cm5 |
| 3 | Cm7 |
| 4 | Cm1 |
| 5 | Cm3 |
| 6 | Cm9 |
| 7 | Cm10 |
| 8 | Cm8 |
| 9 | Cm6 |
| 10 | Cm4 |

DEVICE, SYSTEM, AND METHOD FOR IDENTIFYING LIVING BODIES AND RENEWING REGISTRATION DATA

BACKGROUND OF THE INVENTION

1. Field of the Invention

The present invention relates to a living body collating device for collating and checking a living body image corresponding to a face image inherent to an individual, and more particularly to a living body collating device, a living body collating system, a living body collating method and a registration data renewing method which have a renewing function of automatically renewing and optimizing personal registration data used for collation of individuals.

2. Description of the Related Art

According to a collating device for collating a face image, a face image of a collation target person achieved by using a camera is generally collated with a registered image registered in advance, thereby authenticating personal identification of the collation target person.

In this case, since the identification data of each collation target person are varied with respect to the time variation or various variations of the posture, expression, etc. of the collation target person, an illumination environment under which the collation target person is, etc., it is necessary to renew the registration data of the collation target person in conformity with these variations. Therefore, the collation performance can be kept and enhanced by renewing these registration data.

Accordingly, under the present situation, on the basis of the judgment of a collation manager for managing the registration data, it is generally carried out to select a renewal target for which the registration data are required to be renewed, select renewal setting data to be needed for renewal from the past record data of the renewal target thus selected, select renewal scrap data to be scrapped from the existing registration data and replace the scrap data by the renewal setting data, thereby renewing the registration data.

However, with respect to the renewal operation by the collation manager as described above, the judgment criterion is unclear, so that it needs much time and labor.

For example, the judgment criterion on the following items is not quantified, and thus the collation manager cannot easily make judgments thereon:

(1) renewal person targets;

(2) data to be properly used for renewal; and (3) data to be deleted from the existing data Further, in order to make the collation performance stable, much skill is needed, and in the case of an inexperienced collation manager, the registration data may be carelessly renewed by improper data, or the registration data of a person for which no renewal is needed may be renewed, so that the performance of the collation system is reduced.

SUMMARY OF THE INVENTION

Therefore, an object of the present invention is to provide a living body collating device, a living body system, a living body collating method and a registration data renewing method with which when registration data are renewed, optimum renewal information is automatically extracted to promote automation of the renewal processing, thereby reducing labor imposed on a collation manager and also enhancing the collation performance and security.

In order to attain the above object, the present invention which includes living body information achieving means for achieving living body information; registration data storing means for storing registration data; and collating means for collating the living body information thus achieved with the registration data, is characterized by further including: optimization candidate data extracting means for extracting optimization candidate data for data renewal from the achieved living information when the living body information is collated; optimization candidate data storage means for storing optimization candidate data extracted by the optimization candidate data extracted by the optimization candidate data extracting means; and renewal storage means for newly storing data having high priority as new registration data from the optimization candidate data stored in the optimization candidate data storage means and the registration data stored in the registration data storage means, thereby renewing the registration data.

That is, candidate data for renewal of registration data are usually accumulated in an optimized registration data base, and the registration data and the optimization candidate data are compared with each other in accordance with a renewal instruction, thereby promoting an automatic registration data renewing operation of successively recording the candidate data thus accumulated as new registration data in order of priority from highest to lowest. Accordingly, a renewal work with low reliability on time which has been hitherto carried out by a collation manager for managing renewal of registration data and needed much time and much labor can be eliminated.

As a result, when the registration data are renewed, data of each individual to be used for the renewal of the registration data are automatically collected and prepared, so that it is unnecessary for the collation manager to select the data, and thus the registration data can be accurately renewed in short time by proper data. Further, when the presence or absence of glasses or the like is needed to be specified as registration data, it can be handled by adding as attribute information while the data are renewed. As described above, in order to make the collation manager more easily determine which registration data should be renewed, there can be constructed a collation system in which a proper renewal management can be carried out, a useless renewal work can be eliminated and both high collation performance and high security can be secured.

Here, the term "living body information," covers not only face information of each collation target persons, but also other information inherent to each individual with which each collation target person can be identified, such as fingerprint information, voice print information, etc.

BRIEF DESCRIPTION OF THE DRAWINGS

FIG. 6 is a display diagram showing an extraction display frame of a renewal target person;

FIG. 11 is a diagram showing the renewal processing of an optimization candidate data file.

DETAILED DESCRIPTION OF THE PREFERRED EMBODIMENT

A preferred embodiment according to the present invention will be described hereunder with reference to the accompanying drawings.

Figure 1:
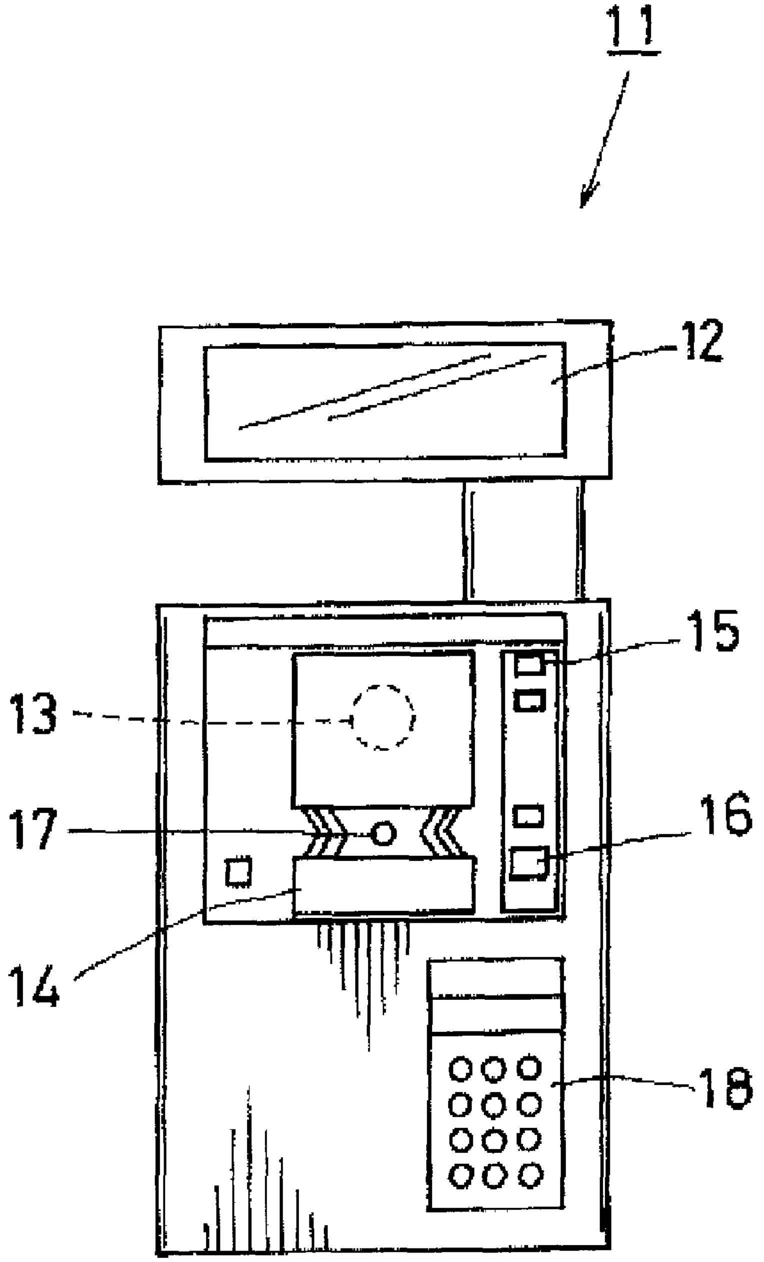
FIG. 1 is a front view showing a face image collating device.

FIG. 1 shows a face image collating device disposed at an image achieving side of a face image collating system for picking up an image of a person for collation.

In FIG. 1, a face image collating device 11 is set up, for example, as a collation target authenticating (identifying) means for managing the opening/closing operation of a door through which collation target persons go in/out. The face image collating device 11 is provided with both of a collating data achieving function and an authentication data achieving function and disposed at the height corresponding to the human face on the surface of the door. The face image collating device 11 is equipped with an illumination device 12 for illuminating the faces of collation target persons at the upper portion thereof, with a camera 13, a person detecting sensor 14, a collation result display LED 15, a collation starting button 16 and a gazing mark 17 at the intermediate portion thereof, and also with a password key (numerical keypad) 18.

The illumination device 12 has plural illuminating LEDs which are arranged so as to irradiate light toward the front face-height position thereof, whereby the uneven conditions on the faces of persons getting near to the camera 13 are clearly illuminated to thereby enhance the face image achieving performance of the camera 13.

The camera 13 described above picks up a face image by using a CCD camera or the like. If a person gets near to the front face of the camera 13, the approach of the person is detected by a person detection sensor 14 such as a reflection type infrared-ray sensor or the like. Further, when the collation r start button 16 is pushed, it is judged that a collation target person requests collation for himself/herself, so that the image pickup operation of the camera 13 is started and the collation operation is started on the basis of the image thus achieved. At this time, a collation result indicating coincidence (identification) and non-coincidence (non-identification) of the collation target person is outputted and displayed on the collation result display LED 15. The collation result display LED 15 may comprise two LEDs which emit different color light (for example, red color light and blue color light). In this case, one of the two LEDs may be turned on in conformity with the judgment result (blue or red), so that the propriety of the collation can be recognized at a glance.

When the above collation is used, the authentication can be performed by using the password key 18 in place of or in combination with the collation start button 16.

The collation data thus achieved is transmitted to a center device 21 (described later) at an authentication monitoring side through a connection cable or in a wireless (radio) style, and the propriety of the collation data is judged in the center device 21.

The center device 21 may be replaced by a control unit of the face image collating device 11 which is disposed in the vicinity of the face image collating device 11. Further, plural face image collating devices 11 may be connected to the center device 21.

Figure 2:
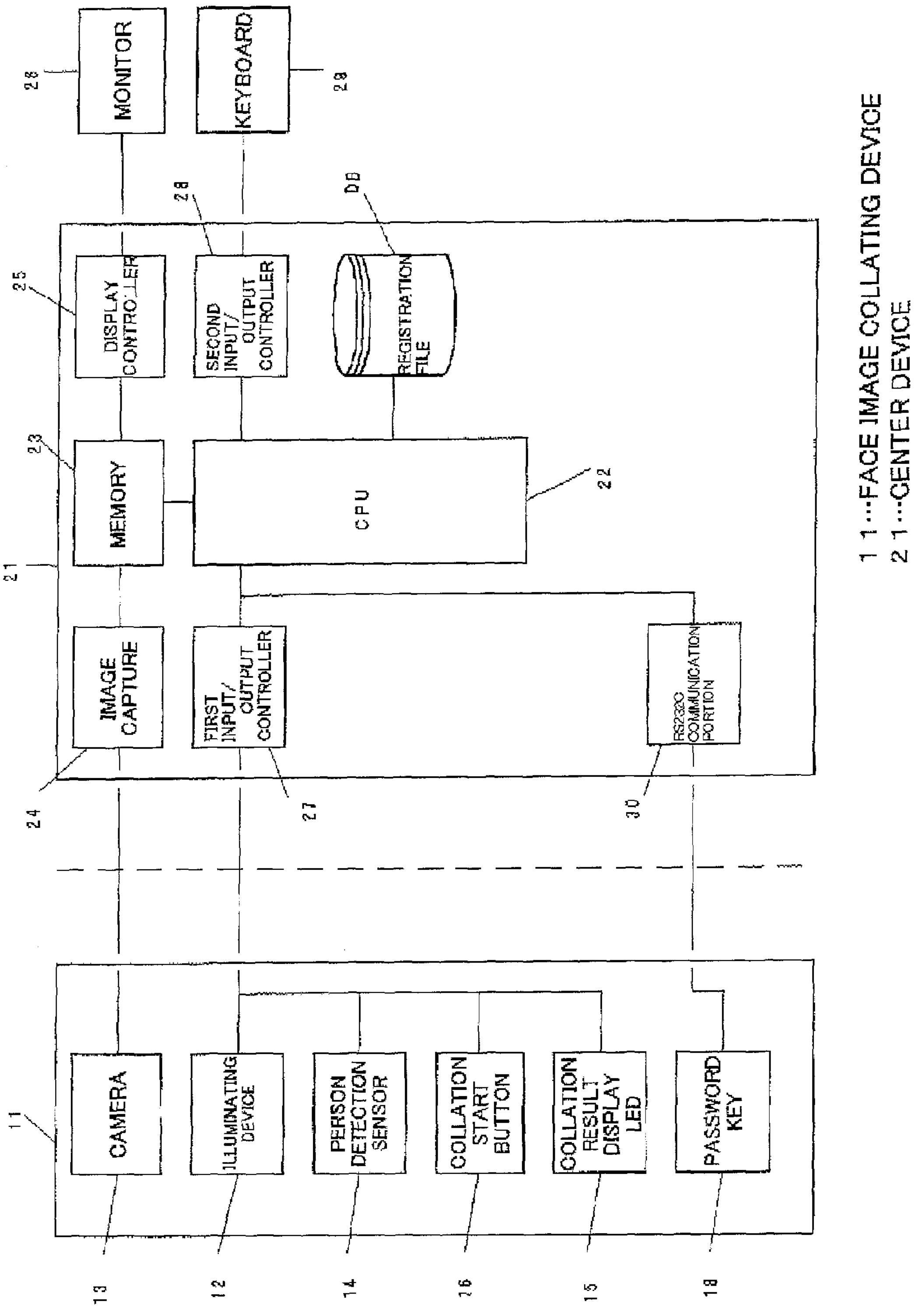
FIG. 2 is a block diagram showing a control circuit of a face image collating system.

FIG. 2 is a block diagram showing a control circuit of the face image collating system, and it is controlled and managed by the center device 21 for controlling various instruments equipped to the face image collating device 11.

CPU 22 of the center device 21 controls each circuit device along the processing procedure of programs stored in CPU 22, and stores the control data thereof in a memory 23.

An image capture 24 achieves an image picked up by the camera 13, and stores the pickup image into the memory 23. The image thus achieved is displayed on a monitor 26 through a display controller 25 for monitoring.

A first input/output controller 27 controls the input/output data of the illumination device 12, the person detection sensor 14, the collation result display LED 15 and the collation start button 16 equipped to the face image collating device 11, and a second input/output controller 28 controls the input from a keyboard 29 for authentication monitoring.

An RS232C communication portion 30 has a communication connecting function of transmitting input data from the password key 18 to CPU 22.

A registration file DB is provided as a data base file when a face image is registered, and the data of feature quantities of a face image of each registrant are stored in the registration file DB.

The CPU 22 collates the face image information of a collation target person picked up by the camera 13 with the pre-registered registration information, and allows or prohibits the collation target person to get into/out of a room or from getting into/out of the room on the basis of the collation judgment result.

Next, the renewal processing of the registration data which are set every collation target person will be described.

Figure 3:
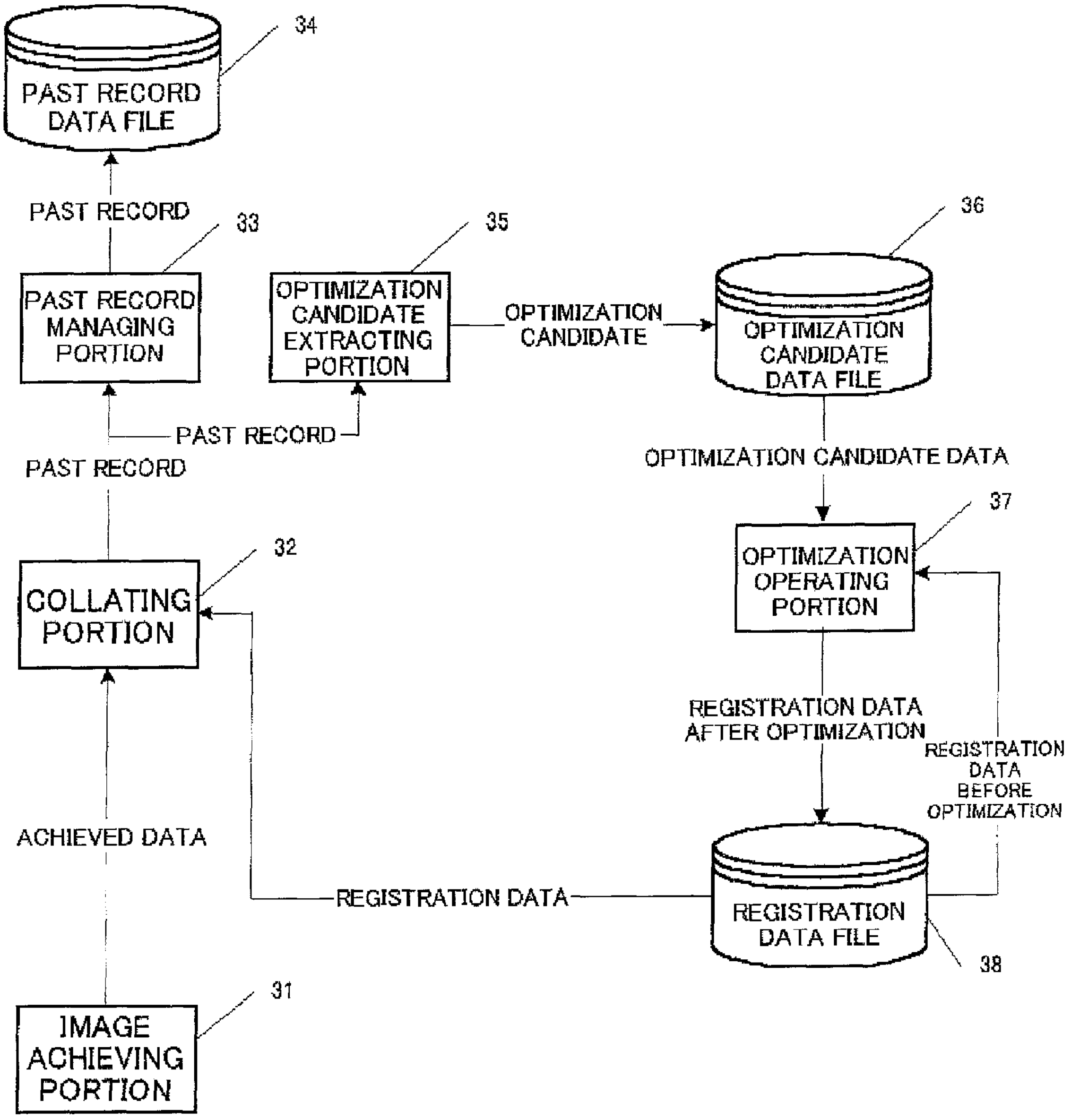
FIG. 3 is a diagram showing the control operation of a center device.

FIG. 3 shows the data processing operation of the center device 21.

First, an image is achieved by an image achieving portion 31, and the face image (achieved data) taken into the image achieving portion 31 is collated with registration data for face authentication {registrant ID+(face image+feature quantities)×n} recorded in the registration data file 38 in advance in a collating portion 32. The authentication result at this time and the past record data of the image are managed in a past record managing portion 33, and finally the past record data of one past record (achievement date+face image+feature quantities+collation result ID) are stored in a past record data file 34.

At this time, optimization candidate data for data renewal are extracted from the past record data achieved in the optimization candidate extracting portion 35 every time one access is made to carry out collation, and stored into the optimization candidate data file 36 every time. Thereafter, if a renewal time comes or a renewal request is made, an optimization operating portion 37 determines the optimization candidate data {registrant ID+(face image+feature quantities)×m} from the optimization candidate data file 36, reads out the registration data stored in the registration data file 38, sets the registration data having the highest priority as new registration data from the registration data thus read out, and registers the new registration data thus determined as a new registration data after optimization into the registration data file 38.

As described above, the optimization data as a renewal candidate achieved at a collation time are accumulated in the optimization candidate data file 36, and then new registration data are created from the optimization candidate data and the existing registration data and registered in the registration data file 38 only when the renewal is carried out.

Next, the extracting function to extract a renewal target person will be described with reference to FIG. 4.

When an identification card or ID number is not used as means of identifying the collation target person, there is no means of identifying the collation target person himself/herself. Therefore, on the basis of the information for which TOP1 recognition having the highest collation value (high collation value) is achieved on the assumption that the actual recognition performance is trusted, the collation target person is identified and the error rate of the collation data is calculated. Further, most of conditions for collation error are based on the case where the collation target person is rejected because a confidence value (collation reliability) serving as a judgment criterion on the collation error is low although a high collation value is achieved and the collation target person can be identified.

Accordingly, the error rate is calculated by setting a second threshold value L2 in consideration of an area lower than a first threshold value L1 serving as the judgment criterion at the actual recognition time. When a collation reliability degree lower than the second threshold value L2 is indicated for a collation target person, the collation target person is judged as anon-registrant because of the low reliability degree, and thus he/she is tot targeted to the error rate calculation.

An upper area A1 having a value higher than the first threshold value L1 is an area that has high collation reliability and provides recognition OK.

The intermediate area A2 between the first threshold value L1 and the second threshold value L2 is an area in which the identification of the collation target person is judged under such a minute variation condition of the collation target person that the collation target person looks away or inclines his/her face. In this area, the collation target person is identified, however, the collation reliability has an intermediate value at which it is difficult to settle the identification of the collation target person. Therefore, in this area, "NG" is judged at the error rate calculation time.

In a lower area A3 in which the collation reliability degree is not more than the second threshold value L2, the collation target person is clearly recognized as another person or a collation element is extremely low. Therefore, in this area, the collation target person is judged as a non-registrant at the error rate calculation time and "NG" is judged at the recognition time.

The threshold value at the error rate calculation time as described above is determined in consideration of the relationship between FAR (False Acceptance Rate) and FRR (False Rejection Rate).

FAR means an error occurrence rate at which another person is erroneously accepted, and FRR means an error occurrence rate at which a registered true person is erroneously rejected. FAR and FRR has the counter relationship in which as one error occurrence rate is increased, the other error occurrence rate is reduced. Therefore, they are adjusted in accordance with needs required by each security system.

Next, the extraction processing operation of renewal target persons will be described with reference to the flowchart of FIG. 5.

Now, if a person goes in front of the face image collating device 11 and pushes the collation start button 16, CPU 22 controls the camera 13 to pick up an image of the face of the collation target person just after the collation start button 16 is pushed. CPU 22 searches the position of the face of the collation target person on the basis of the face image data thus achieved, cuts out a highly potential face-like portion to extract feature quantities of the face such as eyes, nose, mouth, etc. which serve as features for collation, and then carries out the recognition processing of the collation target person on the basis of the feature quantities thus extracted (step n1).

At this time, a collation target person having the highest collation rate (for example, Mr./Mrs./Miss A) is extracted and specified (step n2).

At this time, the collation reliability degree is judged. If the collation reliability degree thus judged is in the upper area A1 above the first threshold value L1, the recognition OK is judged and thus the collation target person is identified it);) as the person himself/herself (step n3).

On the other hand, if the collation reliability degree is judged as being not more than the second threshold value L2 (step n4), non-coincidence of collation is clearly judged and thus the collation target person is recognized as a non-registrant (step n5).

If the collation reliability degree is in the intermediate area A2 between the first threshold value L1 and the second threshold value L2, this area is an area in which a collation error is judged because of a minute variation at the image pickup time, so that the collation error is handled as having an intermediate value in collation reliability degree and thus the error occurrence frequency is counted. At the renewal time of the registration data, not only the image data, but also the error occurrence frequency, the date, the presence or absence of glasses, etc. are used as renewal data.

With respect to the renewal target persons thus extracted, persons having high error rates are listed up as optimal replacement candidates for registered images as shown in FIG. 6.

For example, two persons to which renewal requiring marks 61 are affixed are displayed in FIG. 6. Accordingly, when the registration data are renewed, the collation manager may successively carry out the renewal on the renewal candidates in the order of the renewal requiring marks 61 determined in consideration of the error rates.

Figure 7:
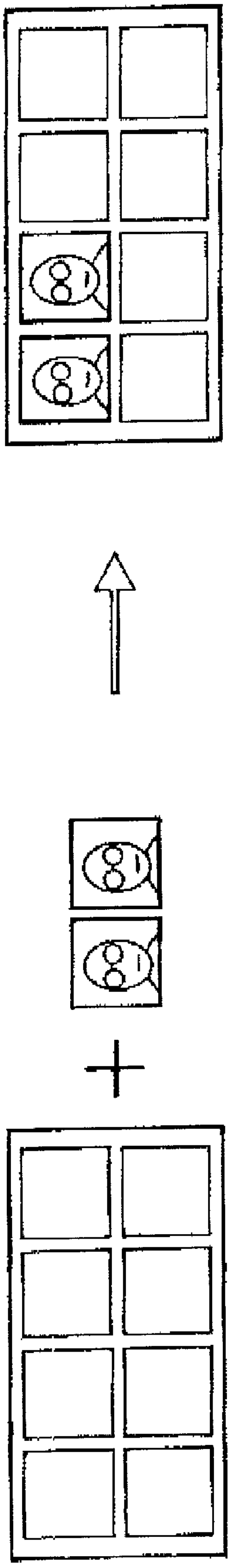
FIG. 7 is a diagram showing an initial registration state of optimization candidate data.

Next, the extraction function of extracting the optimization candidate data will be described with reference to FIG. 7.

The optimization candidate data file 36 is created on the basis of the past record achieved every time a daily access is made to the face image collating device 11. A prescribed number of data (for example, images) are held in the optimization candidate data file 36, and the optimization candidate data file 36 is created to be renewed at all times at the renewal requesting time when the collation manager wishes to renew the registration data.

Figure 4:
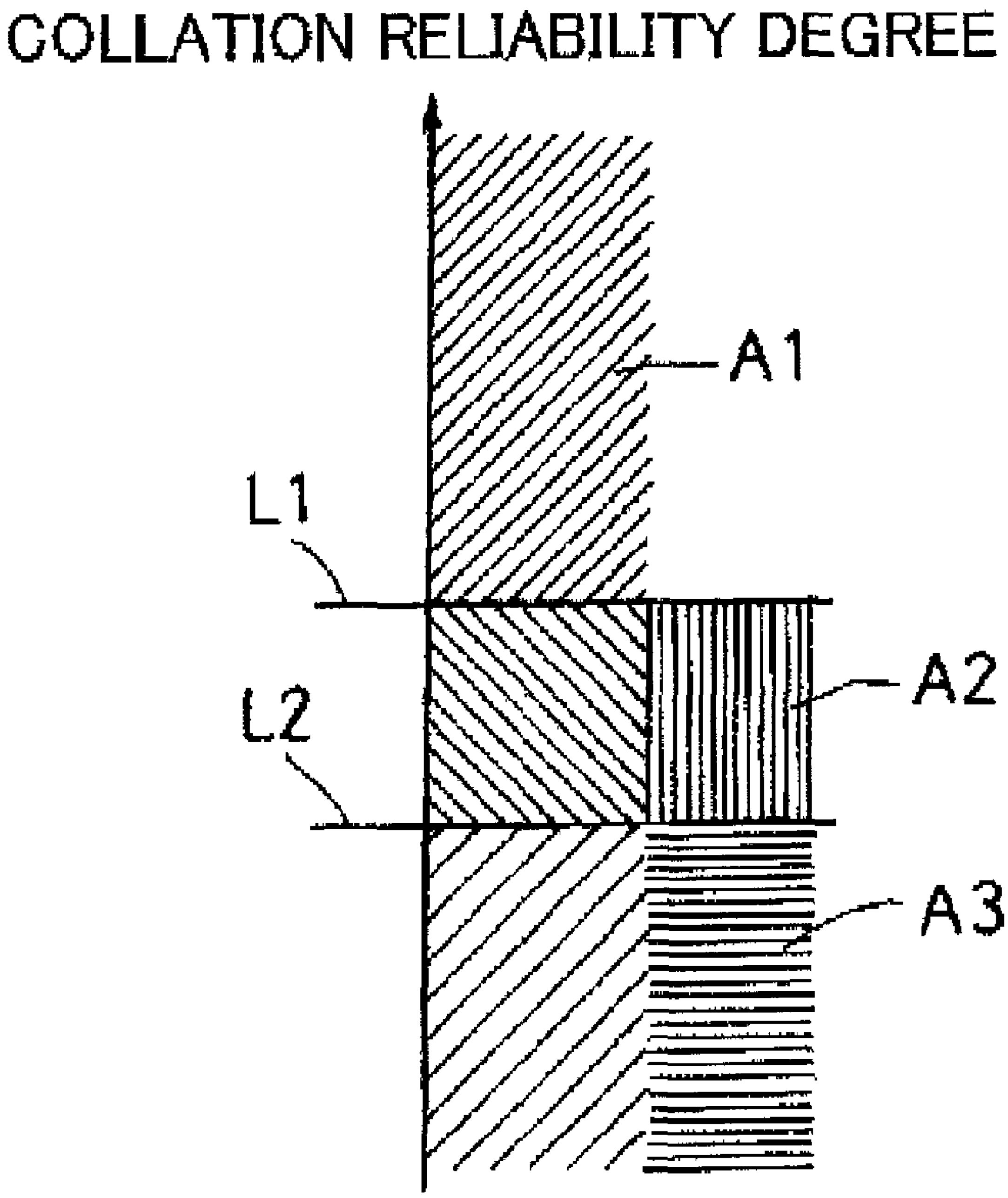
FIG. 4 is a diagram showing an extraction function of a renewal target person.

Data effective to the data renewal in the upper area A1 and the intermediate area A2 shown in FIG. 4 are used as data to be added to the optimization candidate data file 36. The data of the intermediate area A2 are used because the data of the intermediate area A2 mainly contain states (posture, expression) having variation elements different from the normal access states.

By using the data as described above as the registration data, the variations of the registration data are enhanced and the performance can be improved.

For example, when the prescribed number of data (images) held in the optimization candidate data file 36 is equal to eight, at the initial practical use stage, the optimization candidate data file 36 is set to an empty management state (the left side of FIG. 7), and images are successively added until the number of images thus added reaches the prescribed number (eight). The right side of FIG. 7 shows a case where two images are set and registered.

Figure 8:
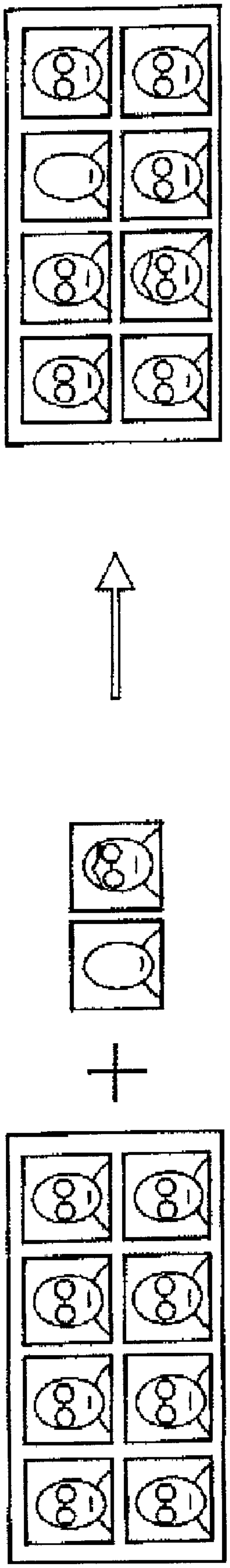
FIG. 8 is a diagram showing an extraction registration state of optimization candidate data.

On the other hand, when the registration data file 38 is full as shown in FIG. 8, the optimization processing of determining images to be added in order of decreasing precedence is carried out. The registration data file 38 is renewed on the basis of the optimization processing. FIG. 8 shows a case where two images are replaced.

Next, the visual check of an improper image and the addition function of attribute information will be described with reference to FIG. 9.

The registration data file 38 which is automatically renewed as described above may contain improper images such as images other than persons, other person's images, etc. in contamination with the images of collation target persons. Accordingly, it is needed to visually check the data of these images and delete improper images before the renewal. Further, other information such as the presence or absence of glasses, etc. which are unrecognizable when the collation is carried out can be added at this time.

Figure 9:
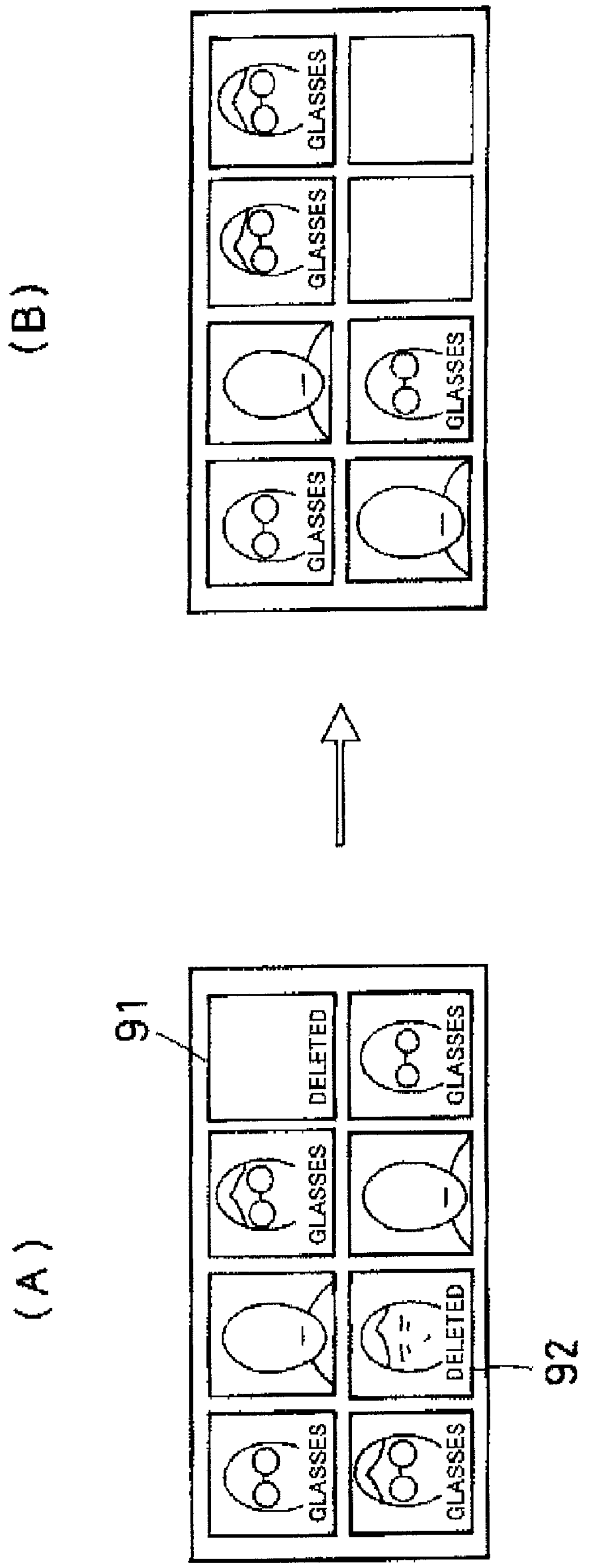
FIG. 9 is a diagram showing visual check of an improper image and an additional function of attribute information.

For example, when there is an improper image 91 having no face image at the upper right corner in eight images, every two images thereof being arranged vertically, and the respective two images thus arranged vertically being aligned on four columns in the horizontal direction as shown in (A) of FIG. 9, or when there is an improper image 92 having another person's image at the second column from the lower left corner in (A) of FIGS. 9, these images 91 and 92 are deleted to renew the original eight images to six registration images as shown in (B) of FIG. 9, and the device is kept on standby for next renewal processing.

Next, a deleted data extracting function will be described with reference to FIG. 10.

When data to be deleted are extracted, these data are determined on the basis of the achieving dates of the existing registration images and the collation using frequencies thereof. Here, the using frequency of a registration image means the frequency at which the registration image is used for collation with collation targets, and it is calculated every access to the device. The data are deleted in increasing order of the using frequency, or if the using frequency is the same, the data are deleted in ascending order of the achieving date.

Further, the condition for deletion can be restricted by using the attribute information described above. For example, an existing registration image 101 having a prescribed number of (eight) images represents the registration data for which the achieving dates, the using frequencies, the presence or absence are extracted as shown in (A) of FIG. 10. The collation manager can delete some images from these images by visually checking the images. (B) of FIG. 10 shows a partially-deleted image result (images after deletion) 102.

Figure 10:
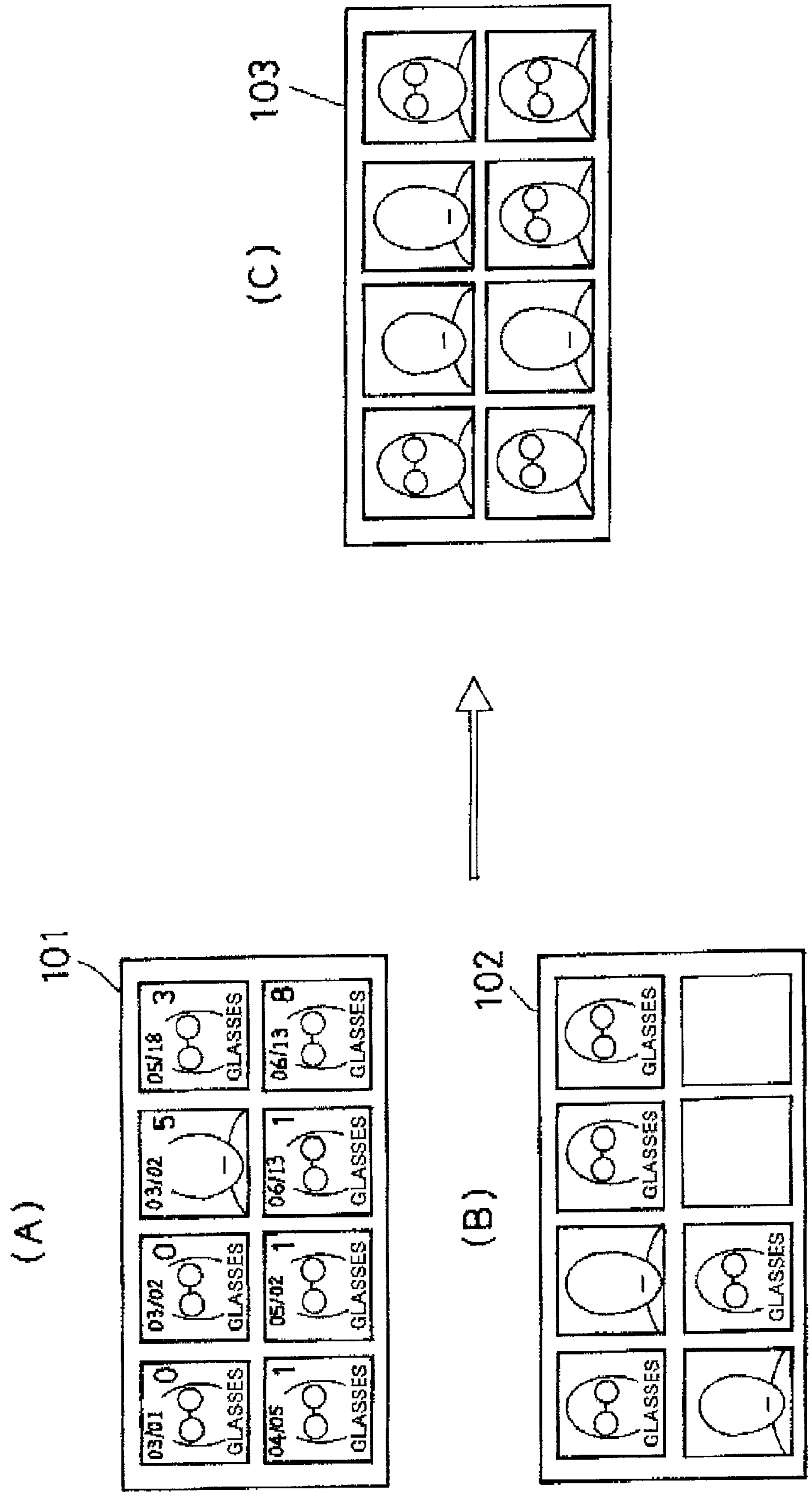
FIG. 10 is a diagram showing an extraction function of deletion data.

Thereafter, a renewal image 103 is achieved by equally renewing the data on the presence or absence of glasses on the basis of the information on the presence or absence of glasses, and (C) of FIG. 10 shows the renewal image 103.

The same person looks very different on the image processing in accordance with the presence or absence of glasses. Therefore, in order to perform the proper processing for persons having glasses irrespective of whether they wear glasses or not, it is preferable that both of an image of a person when he/she wears glasses and an image of the person when he/she wears no glasses are prepared as registration data for the person having glasses.

In this case, with respect to persons having glasses, their states (images) when they wear no glasses are also registered in advance to enhance the collation performance to the persons having the glasses, so that the management of the latest registration data can be performed with respect to the glasses.

FIG. 11 is a diagram showing the renewal processing of the optimization candidate data file 36. As shown in (A) of FIG. 11, round-robin collation is carried out on achieved data (for example, total of ten images) to create a matrix of the collation reliability degree.

Subsequently, the average value of the collation reliability degree every collation data is calculated. As the average value is increased, the average value data indicates that there are a larger number of similar images in the optimization candidate data file 36. That is, if the average value is higher, the image data having the average value has the highest appearance frequency, and if the average value is low, the image data having the average value has the lowest appearance frequency.

Accordingly, if all the registration images from the highest appearance frequency to the lowest appearance frequency are registered as registration images, the recognition performance can be enhanced. It is actually impossible to register all the achieved data, and thus the number of image data is restricted to a prescribed number due to restrictions of the system (memory, disc capacity, etc.).

Accordingly, data to be extracted are not limited to data having high collation reliability, but all data covering from higher collection reliability data to lower collection reliability data are equally extracted on the basis of the table (see (B) of FIG. 11) searched in decreasing order of the average value of the collation reliability degree, thereby easily securing variations of the appearance data.

If only data having high collation reliability are extracted, it seems to be apparently good because it would enhance the collation precision, however, this is not necessarily right. This is because the data having high reliability degree are similar to each other, and thus it is unfavorable from the viewpoint of securing variations.

Accordingly, the variations of the optimization candidate data file 36 and the registration data file 38 can be secured by venturing to extract data having low collation reliability.

As described above, the candidate data used for the renewal of the registration data are usually accumulated in the optimization registration data base, the optimization candidate data and the registration data are compared with each other in accordance with a renewal instruction, and these data are successively registered as new registration data in order of decreasing precedence. Therefore, the automatic renewal of the registration data can be promoted and the renewal work of the collation manager having low reliability on time and needs much time and labor can be eliminated.

In the associating relationship between the construction of the present invention and the construction of the above embodiment, the living body collating device of the present invention corresponds to the face image collating device 11 of the embodiment, the living body information corresponds to the face image, the living body information achieving means corresponds to the camera 13 and the image achieving portion 31, the registration data storage means corresponds to the registration file DB and the registration data file 38, the collating means corresponds to the collating portion 32, the optimization candidate data extracting means and the registration data renewal target person extracting means correspond to the optimization candidate extracting portion 35, the optimization candidate data storage means and the registration candidate data storage means correspond to the optimization candidate data file 36, and the renewal storage means, the error rate calculating means and the registration data renewal target person outputting means correspond to CPU 22, the optimization operating portion 37 and the registration data file 38.

The present invention can be applied on the basis of the technical field described in claims, and it is not limited to the construction of the embodiment described above.

For example, in the above-described embodiment, the data achieving side for the face image data and the authentication data and the center device 21 for authenticating these data are equipped separated from each other. However, the present invention is not limited to this embodiment, and they may be constructed integrally with each other by providing the data achieving side the function of performing the collation and the authentication alone. Further, in the above-described embodiment, the face image is used as the living body information, however, the device may be constructed so that the identification of the collation target person is performed on the basis of fingerprint information or voiceprint information.

According to the present invention, the respective data to be used for renewal of registration data are automatically collected and prepared, so that the collation manager is not required to select these data by himself/herself, and thus the proper data can be accurately renewed in short time. Therefore, the collation manager is not required to select images to be deleted when the renewal is carried out and the proper data can be automatically selected, so that renewal of improper data and unnecessary renewal of data unnecessary for renewal are avoided from being carried out. As a result, there can be constructed by a collation system having high collation performance and high security.

FIGURES

FIG. 2
12 . . . ILLUMINATING DEVICE
13 . . . CAMERA
14 . . . PERSON DETECTION SENSOR
15 . . . COLLATION RESULT DISPLAY LED
16 . . . COLLATION START BUTTON
18 . . . PASSWORD KEY
23 . . . MEMORY
24 . . . IMAGE CAPTURE
25 . . . DISPLAY CONTROLLER
26 . . . MONITOR
27 . . . FIRST INPUT/OUTPUT CONTROLLER,
28 . . . SECOND INPUT/OUTPUT CONTROLLER
29 . . . KEYBOARD
30 . . . RS232C COMMUNICATION PORTION
DB . . . REGISTRATION FILE

FIG. 3
31 . . . IMAGE ACHIEVING PORTION
32 . . . COLLATING PORTION
33 . . . PAST RECORD MANAGING PORTION
34 . . . PAST RECORD DATA FILE
35 . . . OPTIMIZATION CANDIDATE EXTRACTING PORTION
36 . . . OPTIMIZATION CANDIDATE DATA FILE
37 . . . OPTIMIZATION OPERATING PORTION
38 . . . REGISTRATION DATA FILE
A . . . PAST RECORD
B . . . ACHIEVED DATA
C . . . OPTIMIZATION CANDIDATE
D . . . REGISTRATION DATA
E . . . OPTIMIZATION CANDIDATE DATA
F . . . REGISTRATION DATA AFTER OPTIMIZATION
G . . . REGISTRATION DATA BEFORE OPTIMIZATION

FIG. 4
COLLATION RELIABILITY DEGREE

Figure 5:
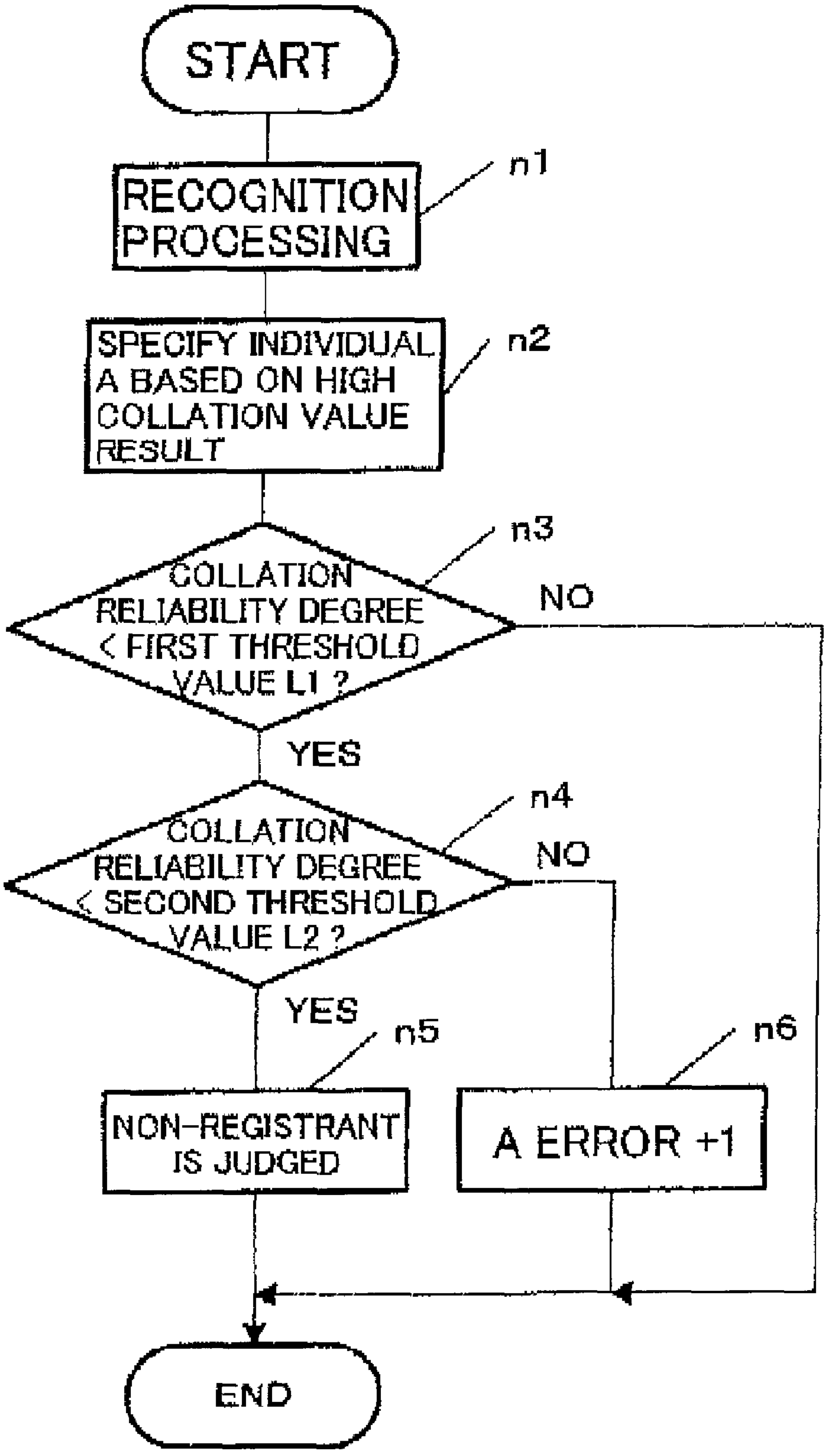
FIG. 5 is a flowchart showing an extraction processing operation of a renewal target person.

FIG. 5
START
N1 . . . RECOGNITION PROCESSING
N2 . . . SPECIFY INDIVIDUAL A BASED ON HIGH COLLATION VALUE RESULT
N3 . . . COLLATION RELIABILITY DEGREE<FIRST THRESHOLD VALUE L1 ?
N4 . . . COLLATION RELIABILITY DEGREE<SECOND THRESHOLD VALUE L2?
N5 . . . NON-REGISTRANT IS JUDGED
N6 . . . A ERROR +1
END

FIG. 6
A . . . OPTIMAL IMAGE RENEWAL
B . . . CURRENT TIME
C . . . LIST OF IMAGE RENEWAL CANDIDATE PERSONS
D . . . NUMBER OF RENEWAL CANDIDATE PERSONS/NUMBER OF REGISTRANTS
E . . . PERSONAL DETAILED INFORMATION DISPLAY
F . . . RENEWAL REQUIRED
G . . . RANK
H . . . ATTRIBUTE
I . . . NAME
J . . . NUMBER OF IMAGES
K . . . NUMBER OF CANDIDATE IMAGES
L . . . BELONGING DEPARTMENT
M . . . TECHNOLOGY DEPARTMENT, SALES DEPARTMENT, . . .
N . . . ALLOW/PROHIBIT ALLOW, PROHIBIT
O . . . PRESENCE/ABSENCE OF GLASSES
P . . .
NUMERICAL KEYPAD, NAME TARO TATEISHI, KANA:TATEISHI TARO
Q . . .
DEPARTMENT CODE
DEPARTMENT: GENERAL AFFAIRS DEPARTMENT
R . . .
TELEPHONE
INFORMATION 1
INFORMATION 2
S . . .
REGISTRATION DATE
RENEWAL DATE OF LAST IMAGE
T . . . IMAGE EDITION
U . . . CANCEL

FIG. 9
(A) GLASSES, DELETED
(B) GLASSES

FIG. 10
GLASSES

FIG. 11 (B)
AVERAGE VALUE

What is claimed is:

1. A living body identifying device comprising:

a living body information imaging means for imaging living body information;

a registration data storage means for storing a registration data;

an identifying means for identifying the living body information thus imaged with the registration data, comprising:

an optimization candidate data extracting means for extracting an optimization candidate data for data renewal from the imaged living body information when the living body information is identified;

an optimization candidate data storage means for accumulating a plural of said optimization candidate data extracted by said optimization candidate data extracting means when a renewal time comes or a renewal request is made;

a renewal storage means for newly storing data having high priority as new registration data from the plural of optimization candidate data accumulated in said optimization candidate data storage means and the registration data stored in said registration data storage means, thereby renewing the registration data when after renewing request has been made;

an error rate calculating means for calculating an error rate of said imaging living body information, a registration data renewal target person extracting means for extracting registration data necessary to be renewed on the basis of the error rate calculated by said error rate calculating means;

said error rate calculating means comprising:

a circuit for maintaining:

a first threshold value used for identification, a second threshold value set to be lower than the first threshold value, and an error value, wherein said error value is not more than the second threshold value.

2. A living body identifying device of claim 1, wherein said identifying means further comprises:

a registration data renewal target person output means for outputting registration data to be renewed in accordance with the frequency of identification failure of said identifying means.

3. A living body identifying device of claim 1, wherein said identifying means further comprises:

a registration candidate data storage means for storing registration candidate unused for collation;

wherein said renewal storage means also renews registration data stored in said registration candidate data storage means with the registration candidate data.

4. The living body identifying device of claim 1, 2, or 3, wherein the registration data comprises:

attribute information, wherein the renewal by said renewal storage means is carried out by using the attribute information.

5. The living body identifying device of claim 4, wherein the attribute information comprises at least one of:

a date data; and a use frequency.

6. The living body identifying device of claim 4, wherein the attribute information comprises:

a flag indicating a presence or absence of glasses.

7. The living body identifying device of claim 1, 2, or 3, wherein the registration data has a predetermined number of image data, and said renewal storage means renews a prescribed number of image data from the predetermined number of image data.

8. The living body identifying device of claim 1, 2, or 3, wherein said optimization candidate data extracting means extracts the optimization candidate data for each living body identification.

9. The living body identifying device of claim 1, 2, or 3, wherein said optimization candidate data extracting means extracts image data having a low degree of identification reliability.

10. The living body identifying device of claim 1, 2, or 3, wherein said optimization candidate data extracting means also extracts image data corresponding to a failure of identification.

11. A living body identifying system, comprising:

a center device that is equipped with optimization candidate data storage means for accumulating a plural of said optimization candidate data extracted by an optimization candidate data extracting means for a predetermined period;

a renewal storage means for storing, as new registration data, the data having higher priorities of the plural of optimization candidate data accumulated in said optimization candidate data storage means and the registration data stored in said registration storage means, thereby renewing the registration data when renewing request is made;

an error rate calculating means for calculating an error rate of imaging living body information; and a registration data renewal target person extracting means for extracting registration data necessary to be renewed on the basis of the error rate calculated by said error rate calculating means, said error rate calculating means comprising:

a circuit for maintaining:

a first threshold value used for identification, a second threshold value set to be lower than the first threshold value and an error value, wherein said error value is not more than the second threshold value.

12. A living body identifying method for imaging an image of a living body and identifying the image with previously stored registration data the method comprising:

extracting optimization candidate data for data renewal from past record data of the living body information thus achieved;

renewing the registration data by selecting data having higher priorities from the optimization candidate data extracted and the registration data, when a renewing request is made;

an error rate calculating means for calculating an error rate of imaging living body information; and a registration data renewal target person extracting means for extracting registration data necessary to be renewed on the basis of the error rate calculated by said error rate calculating means, said error rate calculating means comprising:

a circuit for maintaining:

a first threshold value used for identification, a second threshold value set to be lower than the first threshold value, and an error value, wherein said error value is not more than the second threshold value.

13. A registration data renewing method for a living body identifying system, comprising:

extracting a registration candidate data from a past record;

storing the registration candidate data thus extracted; and renewing registration data for collation by using the registration candidate data, wherein renewed registration data has higher priority than older registration data when renewing request is made;

an error rate calculating means for calculating an error rate of imaging living body information; and a registration data renewal target person extracting means for extracting registration data necessary to be renewed on the basis of the error rate calculated by said error rate calculating means, said error rate calculating means comprising:

a circuit for maintaining:

a first threshold value used for identification, a second threshold value set to be lower than the first threshold value, and an error value, wherein said error value is not more than the second threshold value.

* * * * *